Sept. 23, 1958          K. R. LARSON         2,852,972
PREDETERMINED TORQUE RELEASE PRE-SET
TORQUE MEASURING WRENCH
Filed Nov. 5, 1956                                3 Sheets-Sheet 1
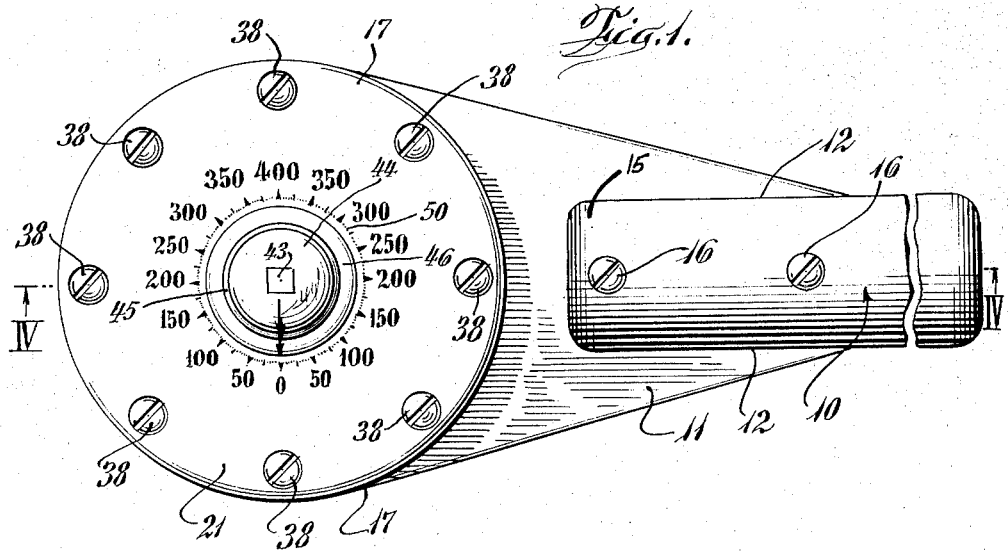
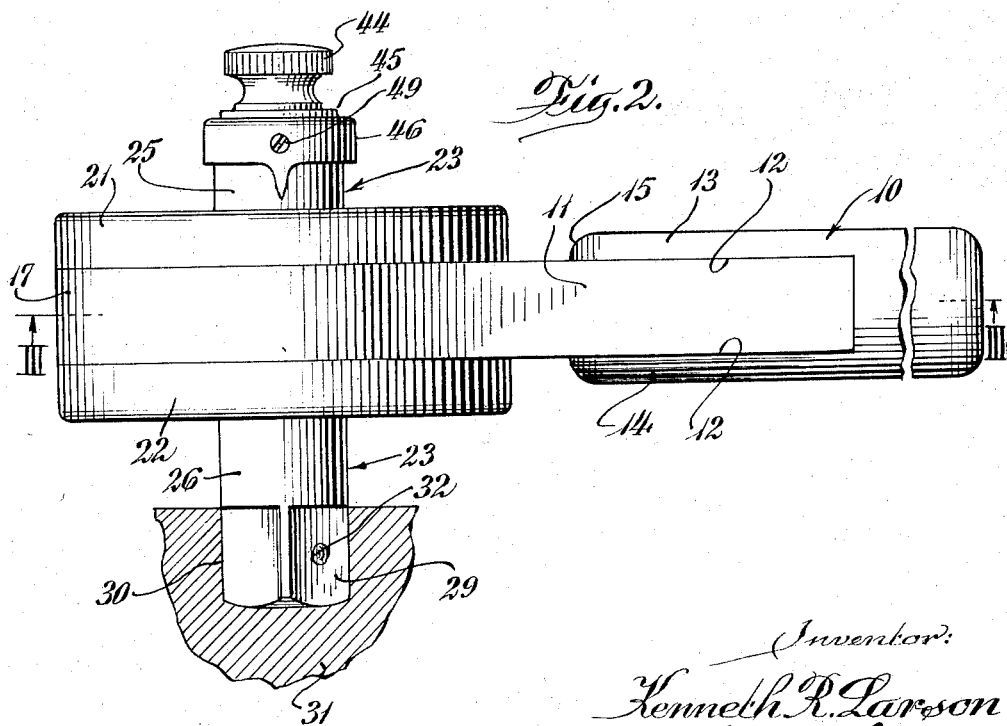
Inventor:
Kenneth R. Larson
By Harry C. Seeds
Attorney.

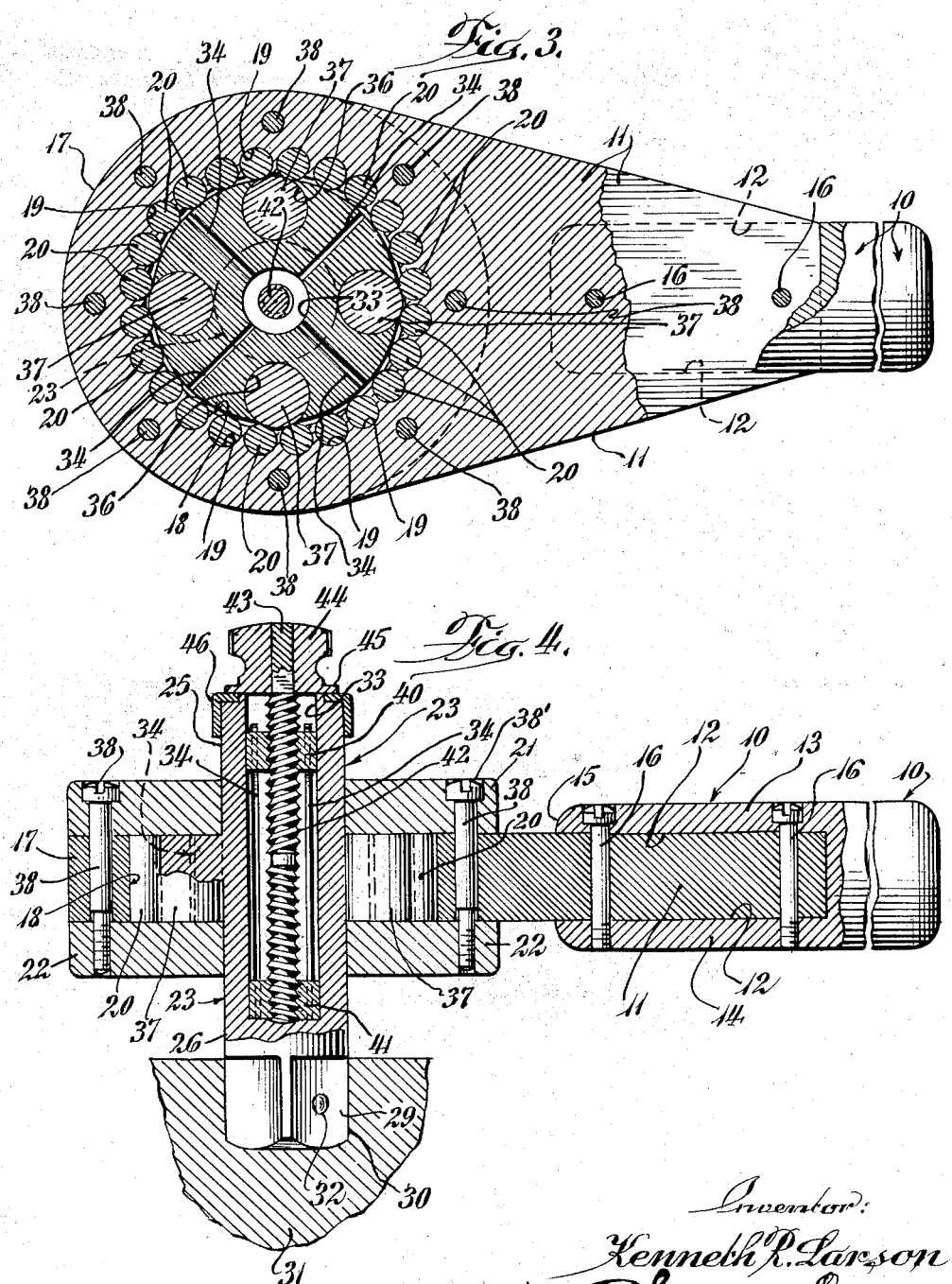

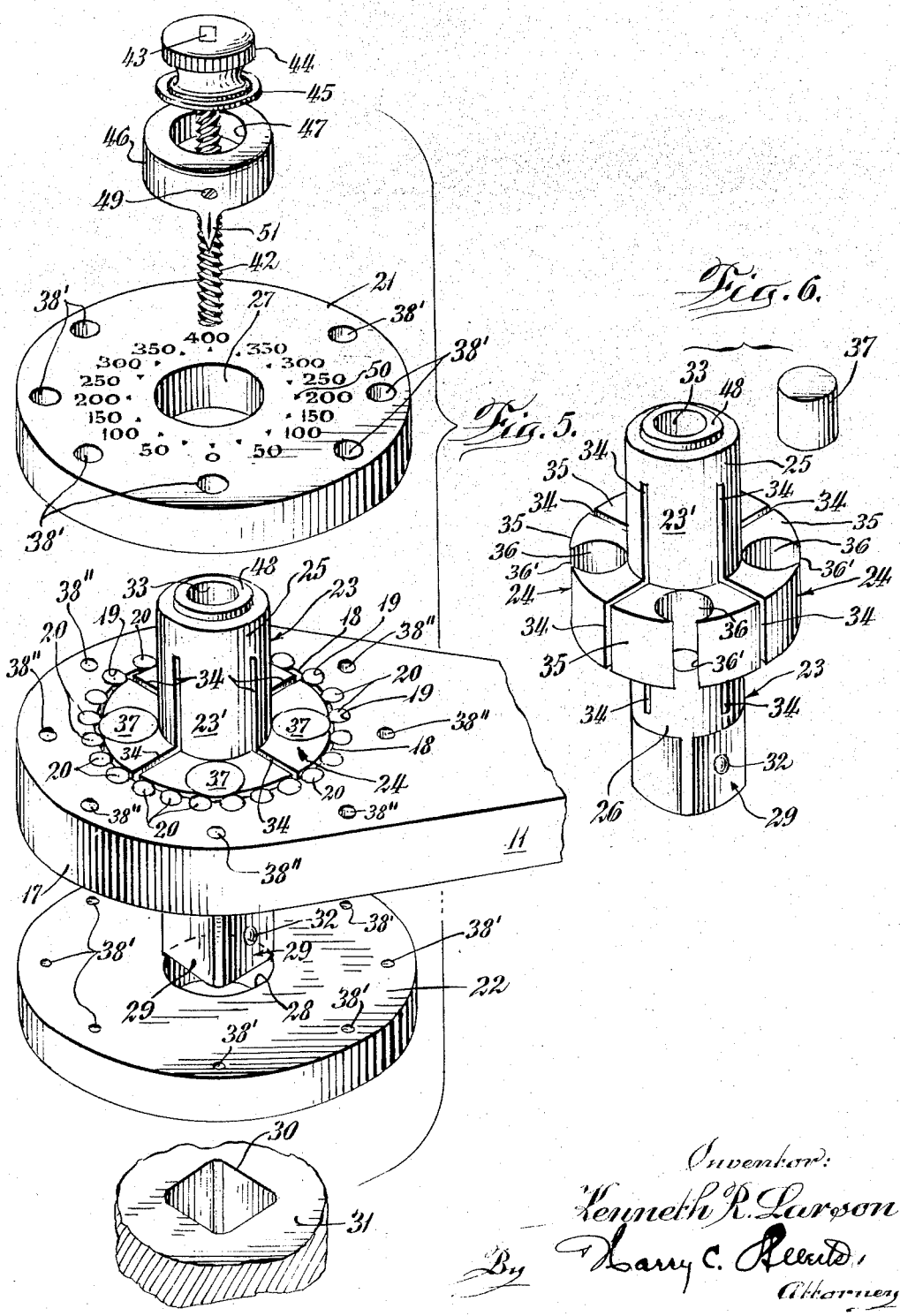

United States Patent Office 2,852,972
Patented Sept. 23, 1958

2,852,972

PREDETERMINED TORQUE RELEASE PRE-SET TORQUE MEASURING WRENCH

Kenneth R. Larson, Des Plaines, Ill., assignor to Snap-On Tools Corporation, Kenosha, Wis., a corporation of Delaware Application November 5, 1956, Serial No. 620,444

15 Claims. (Cl. 81—52.4)

This invention relates to turning devices and more particularly to torque measuring wrenches of the pre-set type, although certain features thereof may be employed with equal advantage for other purposes.

It contemplates more especially the provision of a simple, dependable, accurate and an effective re-set type torque measuring wrench that prescribes the predetermined force to be applied to any tightening operation within a wide range of adjustment, and mechanically releases the applied load commensurate with the presetting thereof.

Numerous types of torque wrenches have heretofore been proposed, and some of these involve pre-set wrenches which measure the flexure in a beam which resists the turning force applied to a wrench for nut or other fastener tightening. Such wrenches require re-setting of the instrumentalities before such may again be applied to a fastener, and utilize friction or other intricate expedients involving many parts which renders them expensive and inaccurate over an extended period of use. This leaves much to be desired for torque measuring wrenches wherein simplicity, accuracy, and dependability are essential to their users.

With the teachings of the present invention, torque resisting flexure is measured in a plurality of related beams arranged around a common axis, and these are coupled with reacting circumferentially arranged rollers which engage each other to serve as an obstruction for load sustaining functions or ride over each other depending upon the degree of flexure in the beams occasioned by the torque impressed load thereon resulting from the turning operation with the force applied to the wrench handle. The presetting is controlled by adjustably spaced fulcrums which support the flexible beams along varying supports spaced by a calibrated mechanism to preset the torque load to be applied which will mechanically release the instrumentalities to preclude any further torque tightening functions to be performed therewith and thus indicating to the attendant that the operation of nut or other tightening operations have been fulfilled. While this is the preferred form of the invention, it is capable of considerable variation in mechanical construction to attain the object of controlling the tightness with which fasteners are applied without the intervention of human error.

Human error in reading meters or in failing to carefully watch the visual indicators on torque measuring wrenches and the like, renders otherwise accurate measuring instrumentalities ineffectual and this is particularly true of torque measuring wrenches so that the present invention contemplates the elimination of human error and the other noted difficulties by providing a mechanical release between the force applying handle and the work engaging head which abruptly and momentarily precludes the further application of turning movement to the fastener and conveys to the attendant the knowledge that the applied torque has reached the predetermined value at which the measuring instrumentalities have been pre-set prior to the application of the wrench. This precludes even the most unobserving attendant to apply more torque turning tightness to a fastener than is initially intended.

One object of the present invention is to simplify the construction and improve the operation of devices of the character mentioned.

Another object is to provide a simple, compact and dependable torque measuring wrench which will release the force applied load at any preset value to preclude further functioning thereof.

A further object is to provide a torque measuring wrench with improved presetting and release means to preclude the use of the wrench beyond the predetermined force for which it is set.

A still further object is to provide a torque resisting flexible beam arrangement connected to the turning handle through a series of reacting rollers which establish the operative connection therebetween.

Still a further object is to provide a torque wrench having a series of flexible beams supported by adjustably spaced fulcrums to vary the extent of reaction between coacting rollers in operative flexing engagement with the flexible beams for effecting the mechanical connection between the handle member and the work engaging head of the measuring instrumentalities.

Still another object is to provide an improved preset releasable connection between the force applying handle and the work engaging head of measuring wrenches to preclude the tightening of fasteners beyond adjustable predetermined and preset values.

Other objects and advantages will appear from the following description of an illustrated embodiment of the present invention.

In the drawings:

Figure 1 is a fragmentary plan view of a torque measuring wrench embodying features of the present invention.

Figure 2 is a fragmentary enlarged side view in elevation of the wrench shown in Figure 1, parts thereof being broken away and shown in section to clarify the showing.

Figure 3 is a sectional view in elevation taken substantially along line III—III of Figure 2.

Figure 4 is a sectional view taken substantially along line IV—IV of Figure 1.

Figure 5 is a perspective view of the measuring wrench shown disassembled with the parts in their relative positions for assembly and spaced from each other to clarify the showing.

Figure 6 is a perspective view of the work engaging member in relation to one of its reacting rollers illustrated in position in Figure 5.

The structure selected for illustration is not intended to serve as a limitation upon the scope or teachings of the invention, but is merely illustrative thereof. There may be considerable variations and adaptations of all or part of the teachings depending upon the dictates of commercial practice. The present invention comprises an elongated handle member 10 to which is attached in any suitable manner a hardened steel shank plate 11 received, in this instance, between a bifurcation 12, the bifurcation 12, 12 being provided on the inner end of the handle member 10 to define spaced furcations 13—14 (Figure 2) which snugly receive the outwardly divergent shank plate 11 fitted to the inner end 15 of the elongated handle member 10. The shank plate 11 is anchored between the handle furcations 13—14 by any suitable means such as but not limited to the threaded fasteners 16.

The hardened steel shank plate 11 diverges outwardly away from the handle member 10 to terminate in an enlarged circular integral head 17 having an internal axial opening 18 interrupted by semi-cylindrical and circumferentially spaced grooves 19, in this instance twenty four, which receive correspondingly shaped but somewhat smaller sized hardened steel rollers 20 freely rotatable therein without any radial freedom or play. The rollers 20 extend for the thickness of the shank plate head 17 for confinement by confronting cover or closure plates 21—22 conforming in size and contour with the circular head 17 of the handle shank 11.

A work engaging axial member 23 of generally cylindrical configuration (Figure 6) is provided with an enlarged median circular shoulder 24 intermediate the supporting hubs 25—26 which rotatively are confined in the axial bores 27—28 provided in the confronting cover or closure plates 21—22. As shown, the lower hub 26 of the work engaging axial member 23 terminates in a polygonal driving end or wrench socket engaging extremity 29 usually but not essentially four-sided to telescopically fit into a correspondingly shaped but somewhat larger opening 30 provided in wrench or other fastener turning sockets 31 (Figure 5) of standard construction. A spring impelled ball detent 32 of standard construction is usually provided in one wall of the polygonal driver end 29 to frictionally retain the wrench or other fastener socket 31 thereon against accidental separation therefrom.

The axial work engaging member 23 is of tubular construction for substantially the entire length thereof save for the driver end 29 of the lower hub 26 which is solid for load carrying strength to a circumferential line above the polygonal end thereof. To this end, the work engaging axial member 23 is provided with an axial bore 33 extending down from the upper end of the hub 25 through the central shoulder portion and for substantially one-half of the lower hub 26. In order that the axial work engaging member 23 may serve as a torque measuring instrumentality, it is longitudinally slitted as at 34 equidistantly around the circumference thereof, in this instance to provide four sections 35 through the hub shoulder 24 and for a substantial portion of the tubular work engaging member 23 on both sides of the circumferential hub 35. The slits or slots 34 extend for substantially the entire tubular work engaging member 23 except for the extreme upper end portion 25 thereof and the bottom portion of the hub 26 proximate to the solid lower polygonal end 29.

The elongated slots 34 extend radially through the intermediate circumferential shoulder 24 which is thereby divided into four quadrants 35 yieldably an integral part of each longitudinal segment comprising a flexible beam circumferentially arranged and related to each other to provide the work engaging member 23 with flexible beam quadrants or for that matter a greater or lesser number thereof may be slitted therein depending upon the dictates of commercial practice. These beams 35 each have a cylindrical bore or recess 36 extending longitudinally through the intermediate hub shoulder 24, and the bores or recesses 36 are sufficiently large in diameter to cut through or interrupt the circumference of the intermediate circular hub shoulder 24 to provide an appreciable slot opening 36'. With this arrangement, hardened steel rollers 37 of appreciable greater diameter than the rollers 20, are sized to freely rotate in the shoulder bores 36' so that a portion of their peripheries projects outwardly from the shoulder slots or openings 36' to extend between and contact pairs of the annularly arranged internal rollers 20 for normal obstructed engagement therewith.

In this position of engagement and reaction between rollers 20 and 37 when the radial bearing load is below a preset maximum, the individual sections or quadrants 35 defined by the vertical slits 34 in the axial work engaging member 23 with its integral intermediate peripheral shoulder 24, are under flexure and yield by reason of the radial reaction between the rollers 20—37. However, these sections 35 do not yield sufficiently to permit the rollers 20—37 to pass each other and disconnect the load transmitting character of the reacting rollers 20—37 until and unless the applied force has a magnitude commensurate with the load for which the calibrated mechanism has been preset as will appear more fully hereinafter. This means that until the preset load value has been attained, the axial work engaging member 23 will turn with the hardened steel shank 11 and its head plate 17 responsive to the manual turning force applied to the handle 10 in either direction for turning a right or left handed fastener threaded member. It should be noted that the sections or quadrants 35 actually serve as flexible beams that will respond to different torque loads to a varying degree as determined by the calibrated presetting instrumentalities to be hereinafter described.

As shown, a plurality of threaded studs 38 are circumferentially spaced around the cover or closure plates 21—22 to extend through apertures 38' therein and with aligning apertures 38" in the shank plate head 17 to maintain the confronting and coacting rollers 20—37 in their proper assembled relation. Obviously other types of fasteners such as rivets can be utilized with equal effectiveness should commercial practice so dictate. It should be noted that in order to provide for the proper resiliency and durability as well as uniform flexure of the longated slotted segments or sections 23'—35 constituting flexible beams of the axial work engaging member 23, it is preferably constructed or shaped from beryllium copper or like material known to possess these flexing characteristics without stressing it beyond its elastic limit over an extended period of flexing operations, that devices of this type must endure without losing their accuracy.

So that the slotted elongated segments or flexible beams 23'—35 may be preset and adjusted to sustain predetermined and calibrated torque loads and beyond which the reacting rollers 20—37 will slip past each other to release the torque sustaining load, the longitudinal effective extent of the load bearing segments 23' are varied by changing the effective length thereof with circular upper and lower supporting discs 40 and 41 serving as beam fulcrums (Figure 4). These discs or fulcrums 40—41 are sized to slidably fit into the axial work engaging bore 33 for threaded engagement with an axial screw 42 having opposite threads on each half thereof to move the discs or fulcrums 40—41 toward or away from each other for equal distances from the center load bearing line of reaction established by the confronting reacting rollers 20—37. The confronting reacting rollers 20—37 transfer the torque load to the successive flexible beams 23'—35 through the intermediate peripheral shoulder 24 so long as the large rollers 37 are lodged between the smaller rollers 20.

This condition occurs so long as the torque load is insufficient in magnitude to flex the sections or beams 23'—35 for a distance that permits the rollers 37 to ride over rather than stay lodged between the rollers 20. The mechanical connection between the handle member 10—11 and work engaging member 23 through the reacting rollers 20—37 will be released beyond the control of the attendant, however, when the torque reacting load transferred to the sections or flexible beams 23'—35 is commensurate in value with the preset value of the calibrated fulcrum adjusting screw 42. Thus a torque load of such value will flex the sections 23' sufficiently beyond the space required for the reacting rollers 20—37 to pass each other so that no further torque load is transmitted to the fastener being tightened therewith and the attendant immediately knows that the operation has been completed and other fasteners can be attended to in the same manner without resetting the wrench parts so long as the degree of tightening is the same for successive fasteners. When the preset torque load has been reached, the displacement of the flexible beams 23'—35 is sufficient to provide enough clearance between the reacting rollers 20—37 for them to pass over each other and thus disengage the work engaging member 23.

The rotary threaded screw 42 effects the setting or spread of the discs or fulcrum supports 40—41 that determine the length or span of the flexible beams 23'—35 for each setting of the screw 42, and the extent of the distance between the fulcrums 40—41 will determine the precise torque load required to flex the beams 23'—35 a sufficient distance to permit the rollers 37 to pass over the rollers 20 with sufficient clearance to eliminate all clutching between the reacting rollers 20—37 and terminate the transmission of any further load to the work engaging member 23 until the applied force is released or at least reduced so that further turning is impossible. The adjustment in the spacing of the fulcrums 40—41 is calibrated and accomplished by anchoring on the screw end 43, a knurled or fluted knob 44 (Figures 4 and 5) having an enlarged bottom flange 45 which contacts and rotates relative to the work engaging member 23. To this end, the knob 44 may be welded to the pointer sleeve 46 which has its interior bore 47 rotatively fitted over the projecting ring 48 of the work engaging member 23 to enable adjustment relative to suitable calibration indicia preferably though not essentially die pressed into the top closure plate 21 (Figure 5). The sleeve 46 is provided with a set screw 49 to retain the screw 42 in adjusted position against accidental rotation.

The pointer sleeve 46 is thus adjustable relative to the calibrations 50 on the top closure plate 21; however, the exact scale or the type of calibration expedients may vary within a wide range depending upon the dictates of commercial practice. So that the fulcrum supports 40—41 will not turn with the screw 42, any suitable expedients may be employed to permit the slidable displacement of the discs or fulcrums 40—41 within the interior bore 33 of the work engaging member 23, but without any rotation therein which is the movement provided for the screw 42. With this arrangement, the knob 44 with its collar 46 may be adjusted relative to the calibrations 50 to the desired preset maximum torque turning load to be transmitted to a fastener 31, and then the dial sleeve ring set screw 49 is tightened against the work engaging member 23 so that this adjustment will not accidentally vary during the use of the wrench on any number of applications for the same setting. The unit of measurement may be calibrated in foot-pounds or foot-inches depending upon the capacity of the wrench or wrenches which is a factor of the dimensional design as well as the cross-section of the flexible beams 23'—35. In short, the fulcrums 40—41 provide the supporting span for the circumferential series of flexible beams 23'—35, and the relative spacing thereof determines the torque load necessary to totally flex each beam 23'—35 through the reaction of the rollers 20—37 to an extent commensurate with and inversely proportional to their spacing, so as to provide the necessary clearance between the rollers 20—37 to release the handle member 10 from operative connection with the load engaging member 23.

It should be observed that the larger the spread between the discs 20—37, the smaller the torque load necessary to create the load reaction on the intermediate shoulder 24 which has radial segments 35 corresponding to and integral with each of the elongated work engaging member segments 23' of the axial load engaging member 23. Thus a plurality of circumferentially spaced flexible beams 23', in this instance four, are provided to determine the value of the preset load at which no further turning of the fasteners engageable by the socket 31 or other expedient for turning is possible without much discomfort on the part of the attendant applying the turning load. The wrench will, after application to another fastener for turning with the same degree of tightness, be ready for the application of the torque load as the next succeeding flexible beam 23'—35 will be ready in combination with the other beams 23'—35 to support the load through the rollers 20—37 which are again in the positions illustrated in Figure 3 until the preset torque load is reached. This stops the turning operation without any overt act of the attendant once the knob 44 has been preset for the desired turning load.

So that the discs 40—41 will not turn with the screw 42, the periphery thereof may be provided with suitable means complementary to special formations on the interior of the work engaging member bore 33 or radial pins (not shown) may be provided thereon to register with the elongated slots 34 depending upon the dictates of commercial practice. It should be observed that this construction and arrangement of parts provides a novel and effective preset torque wrench wherein the fastener turning load is accurately applied at all times without variation due to the alertness or uniformity of response involving error by reason of human variations in reading meters or responding to visual signals of one type or another. The release of the load without and beyond the control of the attendant will avoid error due to variation in human responses to the usual visual, audible or combined signal means ordinarily utilized in torque turning devices. The wrench is always ready for repeated use once the load has been released, and this does not require any resetting of the parts (other than the preset measuring means if different tightness is desired) in that the reacting rollers 20—37 will engage again as soon as the excessive torque load is released by the rollers 37 again becoming lodged between the confronting rollers 20 as the flexible beams 23'—35 return to their initial straight elongated condition as the reaction and frictional connection between the rollers 20—37 cease by the release of the handle member 10 from the work engaging member 23.

The provision of the large number of small successive rollers 20 around the interior of the handle shank opening 18 together with the frictionally confronting larger rollers 37, enables the accurate application of a preset torque load without an abrupt and complete release that would result in undesirable back lash. This is rendered possible by the large number of smaller rollers 20 around the periphery 18—19 so that irregardless of the angular relationship between the handle and shank members 10—11 and the work engaging member 23 that provide a large number of successive bites irrespective of the angular position therebetween at the time of the load release, the handle members 10—11 is ready to engage the work engaging member 23 for immediate re-application of a torque load on another fastener. The release of the torque load by the mechanical disconnection between the rollers 20—37, promptly informs the attendant that the preset load has been attained without any possible error or responsive act on the part of the attendant or user.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a torque measuring wrench, the combination with a handle member, of a torque responsive work engaging member including a flexible beam adapted to yield commensurately with a torque load transmitted thereto through said handle member, and complemental clutching and declutching means interposed between said handle member and said work engaging member to transmit the applied torque load to said flexible beam thereof when the torque load is below a predetermined value and for declutching said handle member therefrom when the applied force is commensurate with a predetermined deflection of the flexible beam for which the clutching and declutching means have a critical clearance, said clutching and declutching means being respectively associated with said flexible beam and said handle member to confront and override each other when said flexible beam has yielded responsive to the torque load to provide clearance between said clutching and declutching means to render said handle member inoperative for sustaining a load.

2. The combination set forth in claim 1 wherein the clutching and declutching means comprise confronting peripheral series rollers for engagement and disengagement depending upon the clearance therebetween controlled by the deflection of the flexible beam.

3. The combination set forth in claim 1 wherein the clutching and declutching means comprise confronting annular series of differently sized rollers for engagement and disengagement depending upon the clearance therebetween controlled by the deflection of the flexible beam.

4. In a torque measuring wrench, the combination with a handle member, of a torque responsive work engaging elongated member, said work engaging member comprising longitudinally slitted complemental flexible beams, and complemental clutching and declutching means interposed between said handle member and said flexible beams to transmit the applied handle member torque load to said work engaging member while deflecting said flexible beams commensurate therewith while the torque load is below a predetermined value and to release said handle member from said work engaging member when the applied torque load is commensurate with the predetermined value for said flexible beam deflection.

5. The combination set forth in claim 4 wherein the clutching and declutching means comprise annular confronting series of coacting rollers for engagement and disengagement depending upon the clearance within said clutch controlled by said flexible beam deflection.

6. The combination set forth in claim 4 wherein the clutching means comprise annular confronting series of coacting rollers of different diameters for overrunning engagement and disengagement depending upon the clearance therebetween controlled by the deflection of said flexible beams.

7. The combination set forth in claim 4 wherein the clutching and declutching means comprise annular series of coating rollers of different diameters mounted in said handle member and on said flexible beams respectively for overrunning engagement and disengagement depending upon the clearance controlled by the deflection of said flexible beams.

8. The combination set forth in claim 4 wherein the longitudinally slitted complemental flexible beams comprise radial sections of said elongated work engaging member having an intermediate peripheral enlarged matching slitted shoulder with one series of rollers rotatively mounted in said last name slitted shoulder and coacting rollers rotatively mounted in said handle member to comprise said complemental clutching and declutching means.

9. The combination set forth in claim 8 wherein the shoulder mounted rollers are larger in diameter than the handle member mounted rollers for normal lodging of the former between the latter.

10. In a torque wrench, the combination with a handle member, of a torque responsive elongated tubular work engaging member, said elongated tubular work engaging member being slitted equidistantly around the periphery thereof to define individual longitudinal closely associated resilient flexible beams, and overrunning clutch means between said handle member and said elongated work engaging member for operative connection with said flexible beams to maintain rotary connection between said handle member and said elongated work engaging member for flexing the beams within predetermined limits for controlling the clearance between the coacting overrunning clutch elements, whereby said clutch means disengages said handle member from said work engaging member when the clearance exceeds a predetermined value.

11. The combination set forth in claim 10 including adjustable means associated with said work engaging member for varying the extent of flexible beam deflection commensurate with the torque load applied to said handle member.

12. The combination set forth in claim 10 including fulcrum spacer means axially associated with said work engaging member for varying the extent of flexible beam deflection commensurate with the torque load applied to said handle member.

13. The combination set forth in claim 10 including screw mounted fulcrums axially associated with said work engaging member to support said flexible beams for varying the extent of deflection therein for predetermined torque loads applied to said handle member.

14. The combination set forth in claim 13 wherein the clutch means comprise interengaging circular series of differently sized confronting rollers which overrun each other when the clearance therebetween substantially equals the combined radii of the confronting rollers.

15. The combination set forth in claim 13 wherein the clutch means comprise interengaging circular series of differently sized confronting rollers rotatively mounted in said handle member and said longitudinal flexible beams of said work engaging member.

References Cited in the file of this patent

UNITED STATES PATENTS

| | | |
|---|---|---|
| 445,615 | Rathbun | Feb. 3, 1891 |
| 1,092,574 | Jansson | Apr. 7, 1914 |
| 1,860,871 | Pouliot | May 31, 1932 |
| 2,250,736 | Torresen | July 29, 1941 |
| 2,461,447 | Siesel | Feb. 8, 1949 |
| 2,771,804 | Better et al. | Nov. 27, 1956 |

FOREIGN PATENTS

| | | |
|---|---|---|
| 846,203 | France | May 27, 1939 |